(No Model.)

J. R. WILSON.
FLUE CLEANER.

No. 491,791.  Patented Feb. 14, 1893.

Witnesses:
C. G. Crannell.
R. F. Osgood

Inventor:
James R. Wilson.
By Geo. B. Selden
atty.

UNITED STATES PATENT OFFICE.

JAMES R. WILSON, OF BUFFALO, NEW YORK.

FLUE-CLEANER.

SPECIFICATION forming part of Letters Patent No. 491,791, dated February 14, 1893.

Application filed June 15, 1892. Serial No. 436,795. (No model.)

*To all whom it may concern:*

Be it known that I, JAMES R. WILSON, a citizen of the United States, residing at Buffalo, in the county of Erie, in the State of New York, have invented certain Improvements in Flue-Cleaners, of which the following is a specification, reference being had to the accompanying drawings.

My invention relates to certain improvements in the construction of flue-cleaners, which improvements are fully described and illustrated in the following specification and the accompanying drawings,—the novel features thereof being specified in the claims annexed to the said specification.

My improvements in flue-cleaners are represented in the accompanying drawings, in which—

Figure 1:
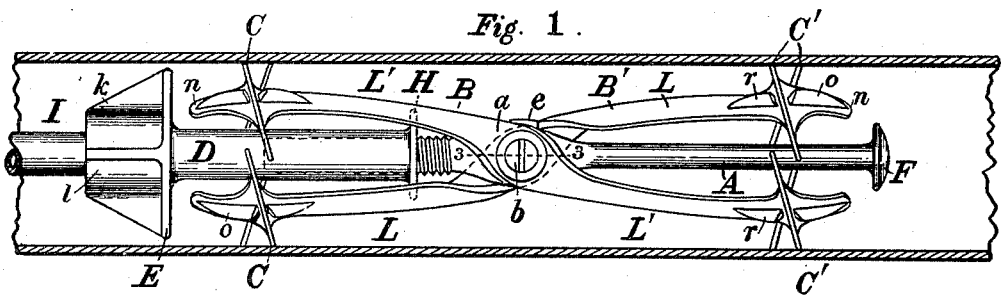
Figure 2:
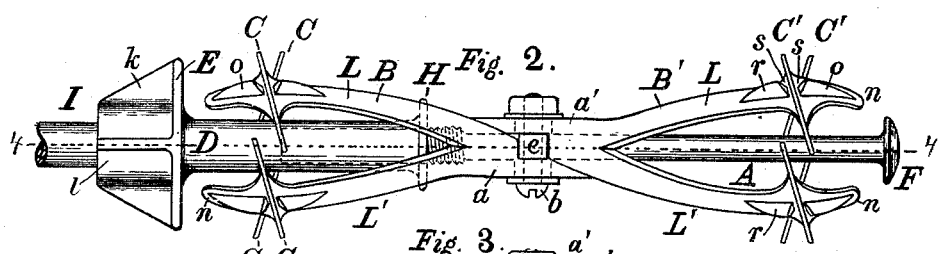
Figure 3:
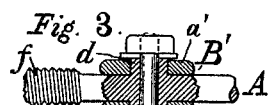
Figure 4:
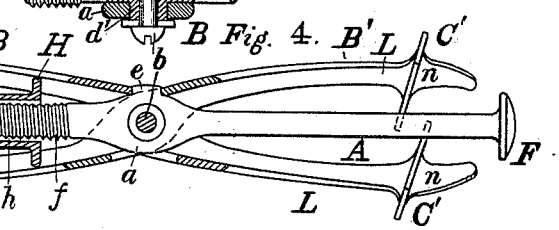
Figure 6:
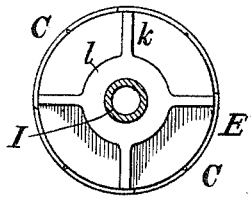
Figure 5:
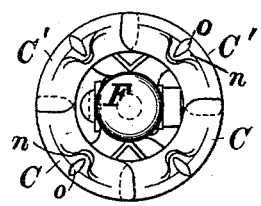
Figure 7:
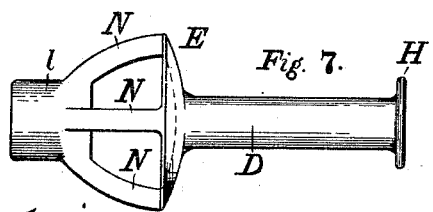
Figure 8:
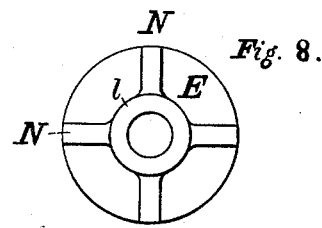

Figure 1 is a side view representing the cleaner in use in a flue. Fig. 2 is a side-view, taken at right angles to Fig. 1. Fig. 3 is a partial longitudinal section on the line 3—3 Fig. 1. Fig. 4 is a longitudinal section on the line 4—4, Fig. 2. Fig. 5 is an end view, as seen from the right hand in Fig. 1. Fig. 6 represents the opposite end. Fig. 7 is an end view of a modification of the cleaning disk. Fig. 8 is a side-view of the same.

My improved flue-cleaner consists essentially of the central stem A, the pivoted adjustable scraper-frames B B', carrying the circular flanges or scrapers C C', and the sleeve D, carrying the cleaning disk E. The frames are pivoted on opposite sides to the stem A, and the sleeve D is adjustable lengthwise of the stem, so that the frames may be spread outward by the contact of the circular flange H with the inner surface of the frames. The frames each consist of a central portion $a$ $a'$, through which the bolt or pivot $b$ passes, and of the two divergent arms L L' extending outward from the stem at an angle, and carrying the curved scrapers at their ends. The frames are made of malleable iron, so that the arms L L' are slightly elastic and yield to permit the scrapers to adjust themselves to any irregularities in the flue. The frames cross the stem at their centers, so that the scrapers at one end of the frame are located on the side of the stem opposite to the scrapers at the other end,—the result of which arrangement is that, as the frame swings on its pivot, the scrapers at its ends move outward or inward simultaneously. The stem A is provided with the bosses $d$ $d'$, Fig. 3, on which the central portions of the frame are pivoted,—the bolt and nut $b$ serving simply in this case to hold the frames in place laterally. The stem is also provided with a lug or stop, $e$, which prevents excessive movements of the frames. The stem also preferably projects beyond the scrapers, and is provided with a button or enlargement F at its end,—to prevent injury to the scrapers in case the instrument is pushed through the flue against the rear wall of the furnace or other obstacle.

A rod or tube I is attached by a screw or other suitable device to the sleeve D, by which the cleaner is moved lengthwise within the flue, and which also serves to adjust the pressure of the scrapers on the inside of the flue, by screwing the sleeve along on the threaded portion $f$ of the stem. As the flange H is moved toward the pivoted point of the frames, the scrapers are spread outward. It will be observed that the thread in the sleeve D is placed at some distance from the flange H,—the inner end of the sleeve outside the thread on the stem being enlarged or provided with a recess, as shown at $h$, Fig. 4. The object of this arrangement is to allow the flange H to yield slightly, toward the axis of the stem, and so as to compensate for any irregularities in the edge of the flange, or in the inner surfaces of the arms of the frames against which the flange bears. By recessing the sleeve, as at $h$, the bearing of the sleeve on the screw is removed from a point opposite the flange, and a certain amount of lateral movement is permitted in the flange as it rotates,—thus preventing any undue resistance from roughness in the surfaces on the flange and arms in contact with each other. The sleeve is cast with a collar or ring, $i$, Fig. 4, of smaller diameter than the recess $h$,—which collar is threaded out to receive the threaded end $f$ of the stem. The disk D is preferably cast with the sleeve. It is made of a diameter slightly smaller than that of the scrapers, and serves to remove from the flue any dust or ashes which may have escaped the scrapers,—being especially useful in furnaces using hard-coal. The inclined ribs $k$ on the disk serve to guide the cleaner into the rear end of the flue, and to strengthen the disk. The sleeve is preferably provided with an enlarged boss, *l*, for the reception of the rod or tube I.

In Figs. 7 and 8 I have represented a modification of the disk, in which it is attached to the boss *l* by the inclined or curved arms N, which secure lightness for the larger sizes of cleaners, and allow greater room for the accumulation of dust or ashes in front of the disk, as it is withdrawn from the flue, since in this construction the boss is removed to some distance from the disk,—and the clogging or packing of the refuse is prevented.

At the ends of the arms L L' are the curved scrapers C C', which, as shown are arranged at an angle with the axis of the stem, and, as indicated in Fig. 5, are made of such a length that the ends lap over each other slightly, and thereby insure the cleaning of the entire interior surface of the flue. The arms are extended beyond the scrapers, and inclined inward, forming wings, *n n*, which carry ribs *o o*, which guide the instrument into either end of the flue, and prevent the accidental breakage of the scrapers. The arms are also provided on the inside of the scrapers with the ribs *r r*. These ribs, however, are preferably not extended to connect with the scrapers, but a notch or recess is made between them and the scrapers, as indicated at *s s*, Fig. 2. It will be understood that the double sets of two scrapers each at each end of the frames form two complete circles of scrapers, which expand equally against the inner surface of the flue, and operate very effectively in removing therefrom any adhering material which accumulates on the lower part of the flue and is carried along by the scrapers, and by the disk when in any excessive quantity, so as to be discharged from the flue at its ends. The disk is placed at the same end of the instrument as the operating rod I. After the cleaner has been introduced into the flue, the pressure of the scrapers may be increased or decreased, by screwing the sleeve D along in one direction or the other on the threaded stem *f*.

I claim.

1. The combination, in a flue-cleaner, of the central stem having a threaded portion at its inner end, a pair of frames, pivoted to the stem on each side thereof, and each consisting of two pairs of elastic divergent arms extending obliquely outward in opposite directions on each side the stem, and carrying circular segmental scrapers at their ends, and a threaded sleeve, adjustable on the stem and provided with a cleaner-disk of smaller diameter than the circular scrapers, and with a circular flange arranged to expand the scrapers, substantially as described.

2. The combination, in a flue-cleaner, of a central stem having a threaded portion at its inner end, a pair of frames pivoted to the stem on each side thereof, and each consisting of two pairs of elastic divergent arms extending obliquely in opposite directions on each side of the stem, and carrying circular segmental scrapers at their ends, and a threaded sleeve, adjustable on the stem and provided with a circular flange arranged to expand the scrapers, and having an enlarged recess at its inner end around the threaded portion of the stem, whereby the flange is permitted to yield to compensate for irregularities in the contacting surfaces of the flange and arms, substantially as described.

3. The combination, in a flue-cleaner, of a central stem, having a threaded portion at its inner end, a pair of frames pivoted to the stem on each side thereof, and each consisting of two pairs of elastic divergent arms extending obliquely in opposite directions on each side of the stem, and carrying circular segmental scrapers at their ends, and a threaded sleeve, adjustable on the stem and carrying a cleaner disk of smaller diameter than the circular scrapers, and having an enlarged recess at its inner end around the threaded portion of the stem, and provided with a circular flange arranged to expand the scrapers, substantially as described.

JAMES R. WILSON.

Witnesses:
JOHN T. GARDNER,
ALONZO R. CLARKSON.